United States Patent [19]
Iiboshi et al.

[11] Patent Number: 5,828,968
[45] Date of Patent: Oct. 27, 1998

[54] METHOD OF CONTROLLING AUTOMATICALLY DRIVEN MOTOR VEHICLE

[75] Inventors: Akira Iiboshi; Takaaki Nagai, both of Wako, Japan

[73] Assignee: Honda Giken Kogyo Kabushiki Kaisha, Tokyo, Japan

[21] Appl. No.: 739,406

[22] Filed: Oct. 29, 1996

[30] Foreign Application Priority Data

Oct. 31, 1995 [JP] Japan .................................. 7-283981

[51] Int. Cl.⁶ .................................................. G06F 165/00
[52] U.S. Cl. ........................... 701/23; 701/25; 180/167; 318/587
[58] Field of Search ................................ 701/23, 24, 25, 701/26, 207, 208, 209, 214, 216; 180/167, 168, 169; 318/587

[56] References Cited

U.S. PATENT DOCUMENTS

| | | | |
|---|---|---|---|
| 4,727,492 | 2/1988 | Reeve et al. | 701/25 |
| 4,908,557 | 3/1990 | Sudare et al. | 701/23 |
| 5,001,635 | 3/1991 | Yasutomi et al. | 701/26 |
| 5,369,591 | 11/1994 | Broxmeyer | 180/167 |
| 5,390,125 | 2/1995 | Sennott et al. | 701/214 |
| 5,563,608 | 10/1996 | Tachita et al. | 701/214 |
| 5,610,815 | 3/1997 | Gudat et al. | 701/23 |
| 5,740,049 | 4/1998 | Kaise | 701/216 |

*Primary Examiner*—Gary Chin
*Attorney, Agent, or Firm*—Lyon & Lyon LLP

[57] ABSTRACT

An automatically driven motor vehicle is controlled to travel automatically along a predetermined running path on a road while successively detecting magnetic sources positioned along the running path with a sensor on the motor vehicle. A position of the motor vehicle on the running path is recognized based on detection of the magnetic sources with the magnetic sensor while the motor vehicle is running along the running path. A present position of the motor vehicle on the running path is estimated based on map information of the running path, which is stored on the motor vehicle, and positional information of the motor vehicle produced upon the detection of the magnetic sources before the sensor becomes unable to detect the magnetic sources, when the motor vehicle deviates from the running path and the sensor is unable to detect the magnetic sources. A steering control quantity for the motor vehicle is corrected based on a positional relationship between the present position and the running path, for thereby automatically returning the motor vehicle to the running path.

3 Claims, 4 Drawing Sheets

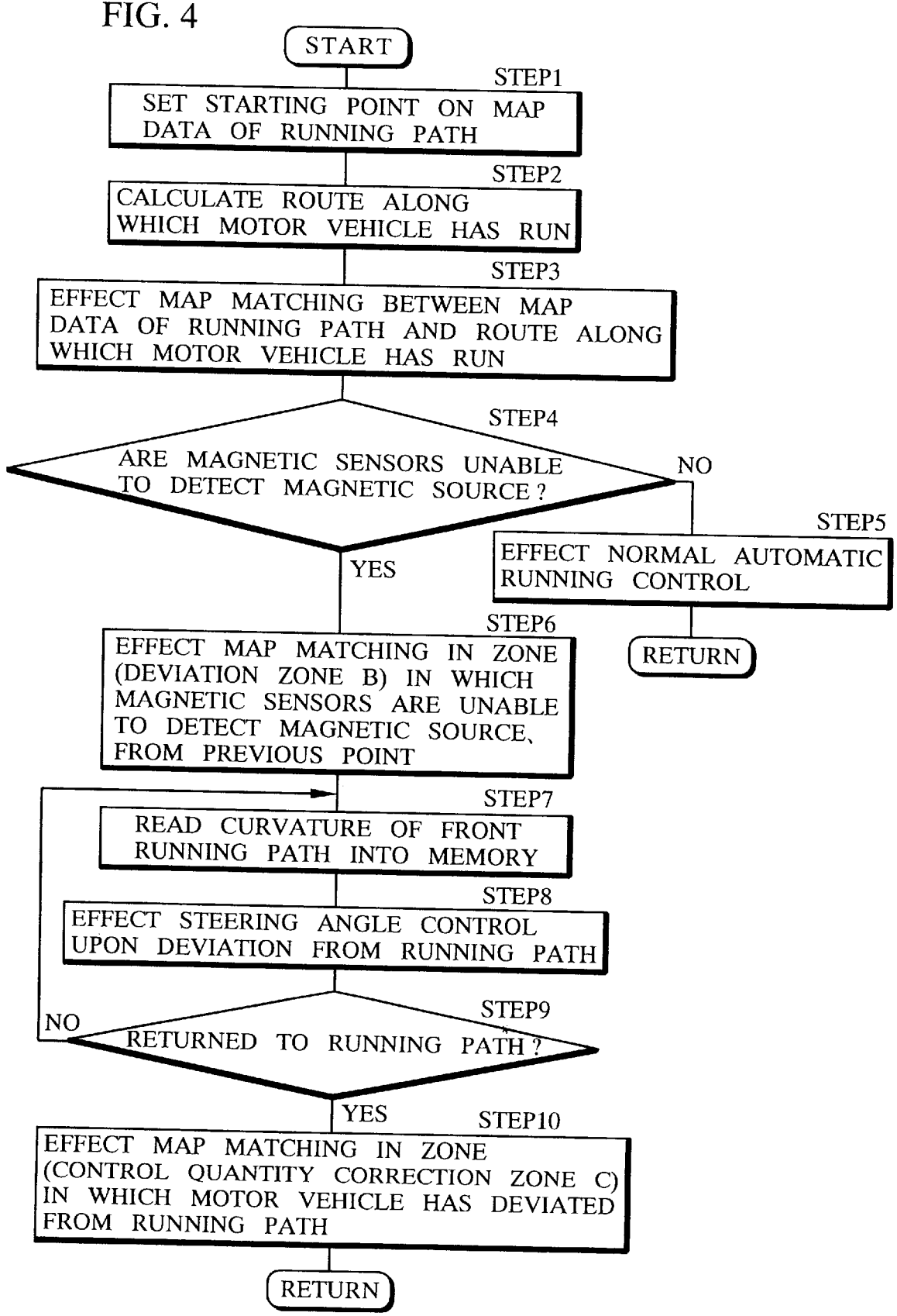

METHOD OF CONTROLLING AUTOMATICALLY DRIVEN MOTOR VEHICLE

BACKGROUND OF THE INVENTION

1. Field of the Invention

The present invention relates to a method of controlling an automatically driven motor vehicle to travel automatically along a predetermined running path on a road while successively detecting magnetic sources or markers positioned along the running path, and more particularly to a method of controlling an automatically driven motor vehicle in the event that the motor vehicle deviates from a predetermined path and fails to detect magnetic sources or markers positioned along the running path.

2. Description of the Prior Art

Research efforts are being made to develop a technology for automatically driving motor vehicles such as automobiles on roads while detecting obstacles with a radar, a CCD camera, or their combination to recognize front obstacles and road conditions. However, there has not been available any technology, to be incorporated into automatically driven motor vehicles, for appropriately recognizing front obstacles and road conditions on any roads.

Automatic vehicle travel control under given conditions has already been practiced in limited applications such as automatic transport carriage control in factories, for example. Such an automatic transport carriage is controlled to travel at a low speed along a predetermined path based on the detection of magnetic markers that are arranged at given intervals along the path.

If a motor vehicle is controlled to run at a higher speed of 60 km/h according to such automatic vehicle travel control while a magnetic marker sensor on the motor vehicle is detecting magnetic markers arranged along a path on a road, then since the speed of the motor vehicle is higher than the speed of the automatic transport carriage, the motor vehicle tends to deviate from the path, causing the magnetic marker sensor to fail to detect the magnetic markers. When the motor vehicle happens to deviate from the path, it is necessary to control the motor vehicle to return to the path.

SUMMARY OF THE INVENTION

It is therefore an object of the present invention to provide a method of controlling an automatically driven motor vehicle to return the motor vehicle smoothly to a predetermined path with an array of magnetic markers in the event that the motor vehicle deviates from the path, and thereby to allow the motor vehicle to run reliably along the path.

To achieve the above object, there is provided in accordance with the present invention a method of controlling an automatically driven motor vehicle to travel automatically along a predetermined running path on a road while successively detecting magnetic sources positioned along the running path with a sensor on the motor vehicle, comprising the steps of recognizing a position of the motor vehicle on the running path based on detection of the magnetic sources with the magnetic sensor while the motor vehicle is running along the running path, estimating a present position of the motor vehicle on the running path based on map information of the running path, which is stored on the motor vehicle, and positional information of the motor vehicle produced upon the detection of the magnetic sources before the sensor becomes unable to detect the magnetic sources, when the motor vehicle deviates from the running path and the sensor is unable to detect the magnetic sources, and correcting a steering control quantity for the motor vehicle based on a positional relationship between the present position and the running path, for thereby automatically returning the motor vehicle to the running path.

While the motor vehicle is running on the running path along which the magnetic sources are arrayed, the position of the motor vehicle on the running path is recognized from time to time based on the detection of the magnetic sources. If the motor vehicle deviates from the running path and the sensor is unable to detect the magnetic sources, then a present position of the motor vehicle on the running path is estimated based on the map information of the running path, which is stored on the motor vehicle, and the positional information of the motor vehicle produced upon the detection of the magnetic sources before the sensor becomes unable to detect the magnetic sources. The steering control quantity for the motor vehicle is corrected based on the positional relationship between the present position and the running path, for thereby automatically returning the motor vehicle to the running path.

More specifically, if the motor vehicle deviates from the running path and the sensor is unable to detect the magnetic sources, then a navigation function on the motor vehicle is utilized to correct the steering control quantity for the motor vehicle for thereby returning the motor vehicle to the running path.

Consequently, in the event the motor vehicle deviates from the running path, it is possible to return the motor vehicle smoothly to the running path and allow the motor vehicle to continue reliably along the running path.

The positional information includes a lateral deviation of the motor vehicle from the running path and an angle of the motor vehicle with respect to the running path in a direction in which the motor vehicle runs, and the positional relationship is estimated based on the lateral deviation and the angle at the time the sensor has finally detected the magnetic sources and a period of time which has elapsed since the sensor finally detected the magnetic sources.

Therefore, when the motor vehicle deviates from the running path and the sensor is unable to detect the magnetic sources, the positional relationship is estimated based on the lateral deviation and the angle at the time the sensor has finally detected the magnetic sources and the period of time which has elapsed since the sensor finally detected the magnetic sources. As a result, the positional relationship is accurately recognized.

Furthermore, the steering control quantity for the motor vehicle is corrected based on a lateral deviation of the motor vehicle from the running path at the estimated present position and a curvature of the running path forward of the estimated present position, which is recognized from the map information.

Inasmuch as the steering control quantity for the motor vehicle is corrected based on the lateral deviation of the motor vehicle from the running path at the estimated present position and the curvature of the running path forward of the estimated present position, it is possible to return the motor vehicle smoothly to the running path forward of the estimated present position.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 4 is a flowchart of an operation sequence of a steering control process (lateral control process) for controlling each of the automatically driven motor vehicles shown in FIG. 1.

DETAILED DESCRIPTION OF THE PREFERRED EMBODIMENT

Figure 2:
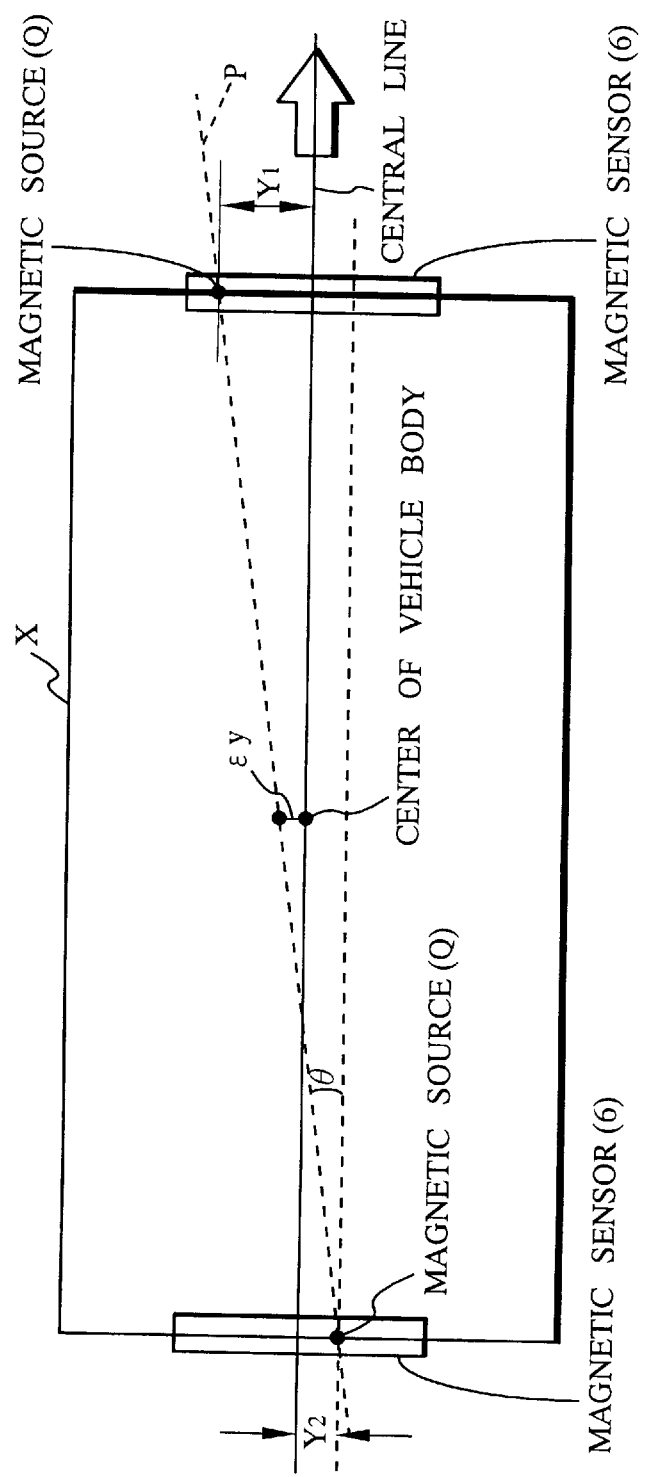
FIG. 2 is a schematic view illustrative of the manner in which each of the automatically driven motor vehicles shown in FIG. 1 operates.
Figure 3:
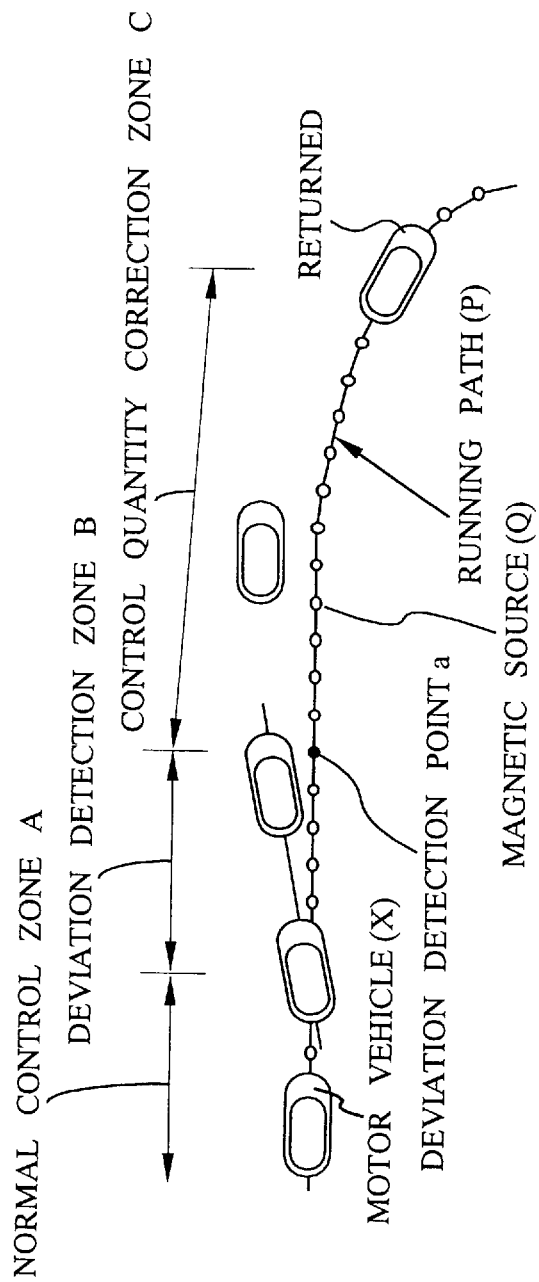
FIG. 3 is a schematic view illustrative of the manner in which each of the automatically driven motor vehicles shown in FIG. 1 operates.

As shown in FIGS. 2 and 3, an automatically driven motor vehicle X controlled by a method according to the present invention automatically runs along a running path P at the center of a road while detecting magnetic sources (magnetic nails or markers) Q which are embedded in the road at given intervals of 1 m, for example. If there is another motor vehicle (not shown in FIGS. 2 and 3) running forward of the motor vehicle X, then the motor vehicle X keeps a given distance between itself and the front motor vehicle while running behind the front motor vehicle. An LCX (leakage coaxial) cable is installed on and along the road for transmitting information to and receiving information from the motor vehicle X. Furthermore, information representing running conditions of front and following motor vehicles is also transmitted between these front and following motor vehicles.

Figure 1:
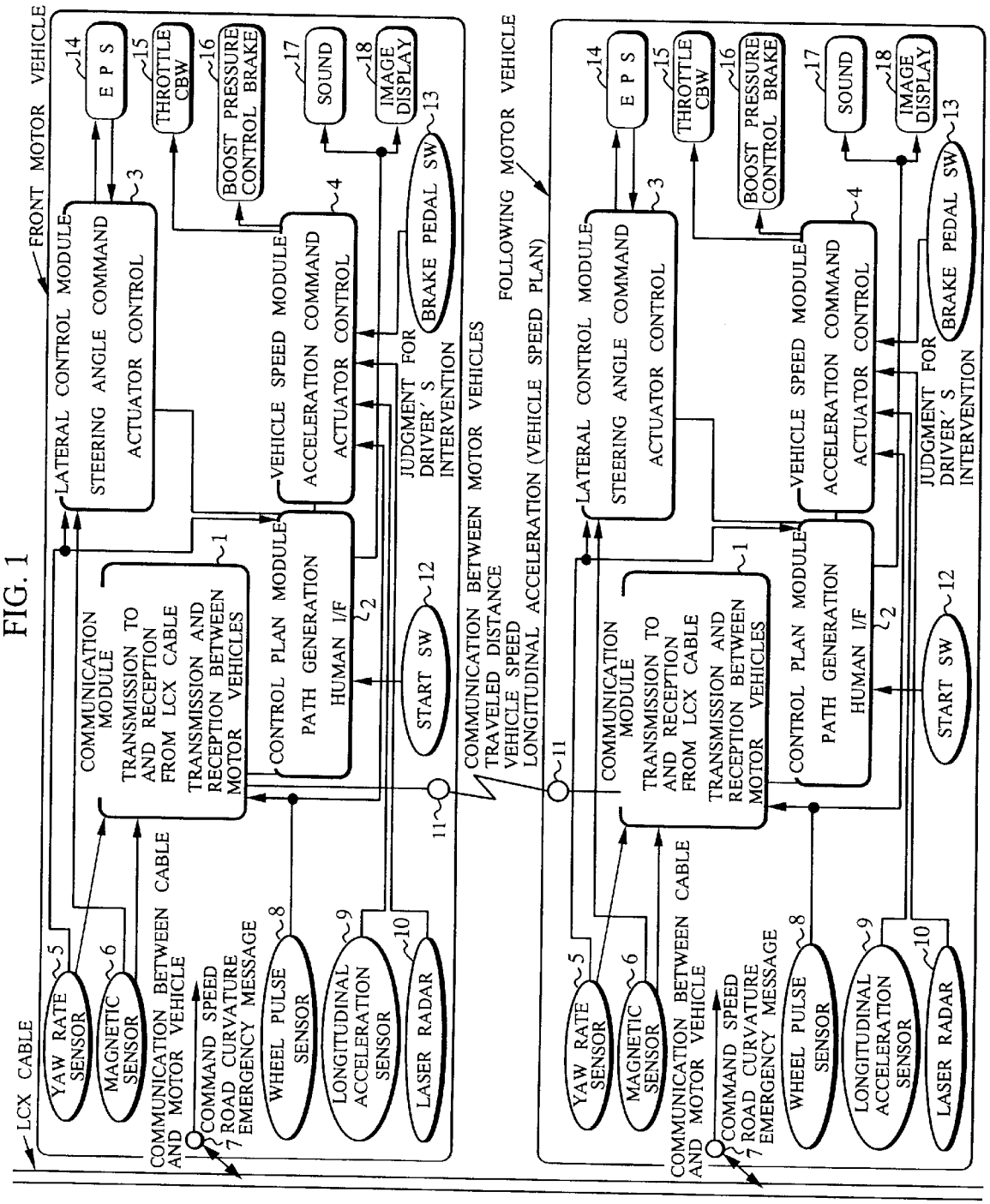
FIG. 1 is a block diagram of a system of automatically driven motor vehicles controlled by a method according to the present invention.

A system of automatically driven motor vehicles is shown in FIG. 1.

FIG. 1 shows two automatically driven motor vehicles, one running forward of the other along a predetermined path. Since these two automatically driven motor vehicles are identical to each other, only one of them will be described below in detail.

As shown in FIG. 1, the motor vehicle has a communication signal processor 1, a control plan processor 2, a lateral (steering) vehicle controller 3, and a vehicle speed controller 4. Each of these processors and controllers comprises a module having a central processing unit (CPU). The motor vehicle also has a yaw rate sensor 5 for detecting an angular velocity of the motor vehicle in a lateral or steering direction thereof, two magnetic sensors 6 for detecting the magnetic sources Q, a wheel pulse sensor 8 for outputting a pulse each time the wheels of the motor vehicle make one revolution, i.e., per distance traversed by the motor vehicle when the wheels make one revolution, a longitudinal acceleration sensor 9 for detecting an acceleration of the motor vehicle in a longitudinal direction of the motor vehicle, and a laser radar 10 for detecting a front motor vehicle or a front obstacle and also detecting the distance up to such a front motor vehicle or a front obstacle. Data detected by the yaw rate sensor 5, the magnetic sensors 6, the wheel pulse sensor 8, the longitudinal acceleration sensor 9, and the laser radar 10 are supplied to the processors 1, 2 and controllers 3, 4.

As shown in FIG. 2, the magnetic sensors 6 are disposed respectively beneath front and rear bumpers of the motor vehicle. Each of the magnetic sensors 6 detects not only the magnetic source Q positioned there below, but also the lateral position of the magnetic sensor 6, i.e., its position in lateral directions of the motor vehicle, with respect to the magnetic source Q within a range of 45 cm on each lateral side of the center of the magnetic source Q, as the lateral position of one of the front and rear ends of the motor vehicle with respect to the magnetic source Q.

When supplied with detected data from the sensors 5, 6, 8, 9 and the laser radar 10, the processors 1, 2 and controllers 3, 4 operate as follows:

The communication signal processor 1 functions as communication means for effecting communication with the LCX cable and also the other motor vehicle through communication devices 7, 11 on its own motor vehicle which each comprise an antenna and a transmitter/receiver.

Specifically, the communication signal processor 1 receives from the LCX cable various items of information including information as to a speed command for the motor vehicle in an area in which it is running, information as to the curvature of the road lying ahead of the motor vehicle, information as to traffic jams, information as to emergency messages, information as to obstacles on the road, and information as to motor vehicles parked on road sides. The communication signal processor 1 supplies the received items of information to the control plan processor 2. The communication signal processor 1 transmits the ID number of its own motor vehicle to the LCX cable. Based on the received ID number, a central control system connected to the LCX cable can recognize the present position where the motor vehicle is running.

The communication signal processor 1 also transmits to and receives from the other motor vehicle, various items of information including information as to the position where the motor vehicle is running, i.e., the distance which the motor vehicle has traveled, on the running path P from time to time, which position or distance is recognized in a manner described later on, information as to the speed of the motor vehicle, information as to the longitudinal acceleration of the motor vehicle, and information as to a speed plan of the motor vehicle. The communication signal processor 1 supplies the received items of information to the control plan processor 2.

An automatic driving start switch 12 is connected to the control plan processor 2. When the automatic driving start switch 12 is turned on, the control plan processor 2 starts generating data for automatically driving the motor vehicle.

The control plan processor 2 has a function to recognize the position of its own motor vehicle on the running path P. According to this function, as shown in FIG. 2, the control plan processor 2 determines, from time to time, a lateral deviation εy of the motor vehicle from the running path P, i.e., the array of magnetic sources Q, and a deviational angle θ formed between the direction in which the motor vehicle is running and the running path P, based on output signals from the two magnetic sensors 6 which represent lateral positional data of the magnetic sensors 6 with respect to the running path P.

According to this function to recognize the position of the motor vehicle, furthermore, the control plan processor 2 recognizes the present position where the motor vehicle is running, i.e., the running point, on map data of the running path P which have been stored in a storage medium (not shown) such as a CD-ROM or the like that is carried on the motor vehicle. Specifically, after the motor vehicle has started to be automatically driven on the running path P, the control plan processor 2 integrates the lateral deviation εy and the deviational angle θ, which are determined based on the detection by the magnetic sensors 6 of the magnetic sources Q, for thereby determining the route which has actually been followed by the motor vehicle. The control plan processor 2 then compares the determined route with the map data of the running path P to recognize the present position where the motor vehicle is running, i.e., the running point, on the map data. If the magnetic sensors 6 fail to detect the magnetic sources Q because the motor vehicle happens to run off the running path P, for example, then the control plan processor 2 recognizes the present position where the motor vehicle is running, i.e., the running point, based on the traversed distance derived from an output signal from the wheel pulse sensor 8 and the angular velocity detected by the yaw rate sensor 5.

The map data of the running path P are represented as data of the array of magnetic sources Q.

The control plan processor 2 also has a function to produce a speed plan which governs the relationship between the position in which the motor vehicle runs and the speed at which the motor vehicle runs on the running path P, based on speed command information in the area in which the motor vehicle is running, given from the LCX cable through the communication signal processor 1. The control plan processor 2 produces a speed plan according to the speed command supplied from the LCX cable.

Furthermore, the control plan processor 2 outputs, to an image display unit 18 and a sound output unit 17, various data including the speed of its own motor vehicle, the distance up to the front motor vehicle, the configuration of the road ahead of the motor vehicle, the configuration of the lane ahead of the motor vehicle, etc.

If the motor vehicle is running as a front motor vehicle ahead of another motor vehicle, then its control plan processor 2 outputs, to the image display unit 18 and the sound output unit 17, various data including the speed of its own motor vehicle, the speed of the following motor vehicle, the distance up to the following motor vehicle, the configuration of the road ahead of the motor vehicle, the configuration of the lane ahead of the motor vehicle, etc.

The data of the distance between the front and following motor vehicles are obtained by the communications between the motor vehicles or the laser radar 10, and the data of the configuration of the road ahead of the motor vehicle, the configuration of the lane ahead of the motor vehicle, etc. are obtained by the communications with the LCX cable.

The lateral vehicle controller 3 generates a steering angle command signal for moving the motor vehicle along the path P based on output signals indicative of the lateral deviation $\epsilon y$ and the deviational angle $\theta$, from the control plan processor 2 and detected signals from the magnetic sensors 6, and outputs the steering angle command signal to control an actuator 14 in a steering operation transmitting system of the motor vehicle.

In response to the command signal, the actuator 14 then automatically steers the motor vehicle to run along the path P, i.e., the array of magnetic sources Q.

The vehicle speed controller 4 generates an acceleration command signal to control the acceleration or deceleration of the motor vehicle based on output signals indicative of the speed plan and the position where the motor vehicle is running, from the control plan processor 2 and detected signals from the wheel pulse sensor 8 and the longitudinal acceleration sensor 9, and outputs the acceleration command signal to control an actuator 15 in a throttle system of the motor vehicle and an actuator 16 in a brake system of the motor vehicle.

In response to the acceleration command signal, the actuators 15, 16 automatically control the throttle and brake systems of the motor vehicle to accelerate or decelerate the motor vehicle. If the motor vehicle is running as a front motor vehicle ahead of another motor vehicle, then the acceleration or deceleration thereof is controlled by the actuators 15, 16 according to the speed plan. If the motor vehicle is running as a following motor vehicle behind another motor vehicle, then the acceleration or deceleration thereof is controlled by the actuators 15, 16 to keep a suitable distance between itself and the front motor vehicle while running behind the front motor vehicle.

A brake pedal switch 13 for detecting when a brake pedal (not shown) of the motor vehicle is pressed is connected to the vehicle speed controller 4. If the brake pedal switch 13 detects when the brake pedal is pressed, then the control process of the vehicle speed controller 4 is canceled.

The vehicle speed controller 4 controls braking forces applied to the motor vehicle based on an output signal from the laser radar 10 in the event that the laser radar 10 detects an obstacle other than a front motor vehicle, for example.

A steering control process (lateral control process) for controlling each of the automatically driven motor vehicles shown in FIG. 1 will be described below with reference to FIGS. 3 and 4.

For starting automatically running the motor vehicle, information as to a starting point is initially established on map data of the running path P (the array of magnetic sources) in the control plan processor 2 in a step S1. That is, the position where the motor vehicle starts running on the running path P is registered on the map data of the running path P.

After the motor vehicle has started running, a route along which the motor vehicle x has run is calculated based on the lateral deviation $\epsilon y$ and the deviational angle $\theta$ with respect to the running path P, which have been determined from output signals from the magnetic sensors 6, or based on the angular velocity detected by the yaw rate sensor 5 and the traveled distance determined from an output signal from the wheel pulse sensor 8, in a step 2.

In a step 3, map data of the running path P (the array of magnetic sources Q) are read from the storage medium such as a CD-ROM on the motor vehicle into a memory in the control plan processor 2, and the present position in which the motor vehicle is running on the running path P is determined per predetermined distance. This process is referred to as map matching, and effected in a normal control zone A shown in FIG. 3. At this time, the lateral deviation $\epsilon y$ and the deviational angle $\theta$ which have been determined from output signals from the magnetic sensors 6 upon detection of magnetic sources Q are stored in the memory in association with the position of the motor vehicle on the running path P.

Then, a step 4 determines whether the magnetic sensors 6 are unable to detect the magnetic sources Q or not per predetermined distance. If the magnetic sensors 6 are able to detect the magnetic sources Q, then the motor vehicle is continuously automatically controlled to run in a normal control process while the steering angle and vehicle speed thereof are being controlled in a step 5.

In the step 5, the lateral vehicle controller 3 calculates a steering control quantity $\delta$ (a steering angle to be controlled) is calculated according to the following equation (1), and effects steering control on the motor vehicle based on the calculated steering control quantity $\delta$:

$$\delta = P(V, 1/R) \times \epsilon y + I(V, 1/R) \times \int \epsilon y \, dt \qquad (1)$$

where $P(V, 1/R) \times \epsilon y$ is a proportionally controlled term of the lateral deviation $\epsilon y$, V represent the vehicle speed of the motor vehicle, 1/R represents the curvature of the road ahead of the motor vehicle as derived from the map data of the running path P, and P(V, 1/R) is a predetermined coefficient depending on the vehicle speed V and the curvature 1/R. The coefficient P(V, 1/R) is basically determined such that it is smaller as the present vehicle speed V is greater, and greater as the curvature 1/R of the road ahead of the motor vehicle is greater. In the equation (1), I(V, 1/R)×∫εydt is an integrally controlled term of the lateral deviation εy, and I(V, 1/R) is a predetermined coefficient depending on the vehicle speed V and the curvature 1/R. The coefficient I(V, 1/R) is basically determined such that it is smaller as the present vehicle speed V is greater, and greater as the curvature 1/R of the road ahead of the motor vehicle is greater.

If the motor vehicle deviates from the running path P and cannot detect the magnetic sources Q on the road, then a step 6 effects map matching in a zone (deviation detection zone B in FIG. 3) from a point where the previous map matching has ended to a present point where the magnetic sensors 6 are unable to detect the magnetic sources Q for the present map matching. Specifically, data of the running path P from the point where the previous map matching has ended are extracted from the map data, and compared with the route along which the motor vehicle has run, thereby to estimate a present point where the motor vehicle is running, and then a point (a deviation detection point "a" in FIG. 3) on the running path P which corresponds to the estimated point is determined. Furthermore, the calculation of the route along which the motor vehicle runs is continued subsequently to the deviation detection point "a". Based on the lateral deviation Ey and the deviational angle θ at the time the magnetic sensors 6 have finally detected the magnetic sources Q before the magnetic sensors 6 become unable to detect the magnetic sources Q and also on the time "t" that has elapsed after the magnetic sensors 6 finally detected the magnetic sources Q, a lateral deviation ε (a, t) of the motor vehicle with respect to the running path P at the present deviation detection point "a" is estimated. In this manner, the positional relationship of the motor vehicle, which has deviated from the running path P, to the running path P is recognized.

In a step 7, the curvature 1/R (road curvature) of the running path P over a distance from the deviation detection point "a" which corresponds to the present position of the motor vehicle where the magnetic sources Q cannot be detected are read into the memory based on the map data.

In a step 8, a steering control quantity δ (a steering angle to be controlled) is calculated according to the following equation (2) based on the lateral deviation ε (a, t) of the motor vehicle with respect to the running path P at the present deviation detection point "a" and the curvature 1/R of the running path P forward of the deviation detection point "a":

$$\delta = A(1/R) \times P(V, 1/R) \times \varepsilon y(a, t) + B(1/R) \times I(V, 1/R) \times \int \varepsilon y(a, t) dt \quad (2)$$

where A(1/R) is a corrective coefficient for the proportionally controlled term P(V, 1/R)×εy, and B(1/R) is a corrective coefficient for the integrally controlled term I(V, 1/R)×∫εydt, each being a function of the forward curvature 1/R. These corrective coefficients A(1/R), B(1/R) are basically determined such that they are greater as the curvature 1/R is greater. In the equation (2), P(V, 1/R) and I(V, 1/R) represent the same coefficients as those in the equation (1). Therefore, the equation (2) is a modification of the equation (1) produced by replacing the lateral deviation εy determined upon detection of the magnetic sources Q with the estimated lateral deviation εy(a, t) and correcting the proportionally and integrally controlled terms with the corrective coefficients A, B depending on the curvature 1/R.

Then, the steering operation of the motor vehicle is controlled depending on the steering control quantity δ determined according to the above equation (2).

Since the estimated lateral deviation εy(a, t) is employed to determine the steering control quantity δ taking into account the corrective coefficients A, B depending on the curvature 1/R, as described above, the motor vehicle can be controlled to be displaced more quickly toward the running path P than it is subjected to normal steering control. Consequently, even when the magnetic sensors 6 are unable to detect the magnetic sources Q, the motor vehicle can automatically be returned smoothly to the running path P.

A step 9 determines whether the magnetic sensors 6 have detected the magnetic sources Q again or not, i.e., whether the motor vehicle has returned to the running path P or not. If the motor vehicle has not returned to the running path P, then the steps 7 and 8 are repeated to effect the steering control process on the motor vehicle. If the magnetic sensors 6 have detected the magnetic sources Q, the return to the running path P is recognized, and the route in the zone (a control quantity correction zone C) in which the motor vehicle has deviated from the running path P and the running path P in this zone are subjected to map matching in a step 10. After the present position of the motor vehicle on the running path P is recognized, the motor vehicle is automatically controlled to run in the normal control process.

In the method according to the present invention, therefore, even if the motor vehicle deviates from the running path P and cannot detect the magnetic sources Q on the road, it is possible to return the motor vehicle smoothly to the running path P, and hence to automatically control the motor vehicle to run reliably along the running path P.

Although a certain preferred embodiment of the present invention has been shown and described in detail, it should be understood that various changes and modifications may be made therein without departing from the scope of the appended claims.

What is claimed is:

1. A method of controlling an automatically driven motor vehicle to travel automatically along a predetermined running path on a road while successively detecting magnetic sources positioned along the running path with a sensor on the motor vehicle, comprising the steps of:

recognizing a position of the motor vehicle on the running path based on detection of the magnetic sources with the magnetic sensor while the motor vehicle is running along the running path;

estimating a present position of the motor vehicle on the running path based on map information of said running path, which is stored on the motor vehicle, and positional information of the motor vehicle produced upon the detection of the magnetic sources before the sensor becomes unable to detect the magnetic sources, when the motor vehicle deviates from the running path and the sensor is unable to detect the magnetic sources; and correcting a steering control quantity for the motor vehicle based on a positional relationship between said present position and said running path, for thereby automatically returning the motor vehicle to the running path.

2. A method according to claim 1, wherein said positional information includes a lateral deviation of the motor vehicle from said running path and an angle of the motor vehicle with respect to said running path in a direction in which the motor vehicle runs, and wherein said positional relationship is estimated based on said lateral deviation and said angle at the time said sensor has finally detected the magnetic sources and a period of time which has elapsed since said sensor finally detected the magnetic sources.

3. A method according to claim 1, further comprising the step of correcting the steering control quantity for the motor vehicle based on a lateral deviation of the motor vehicle from said running path at said estimated present position and a curvature of the running path forward of the estimated present position, which is recognized from said map information.

* * * * *